Nov. 10, 1925.  
C. L. SARNELLE  
AUXILIARY FUEL TANK FOR AUTOMOBILES  
Filed April 10, 1923
1,561,358
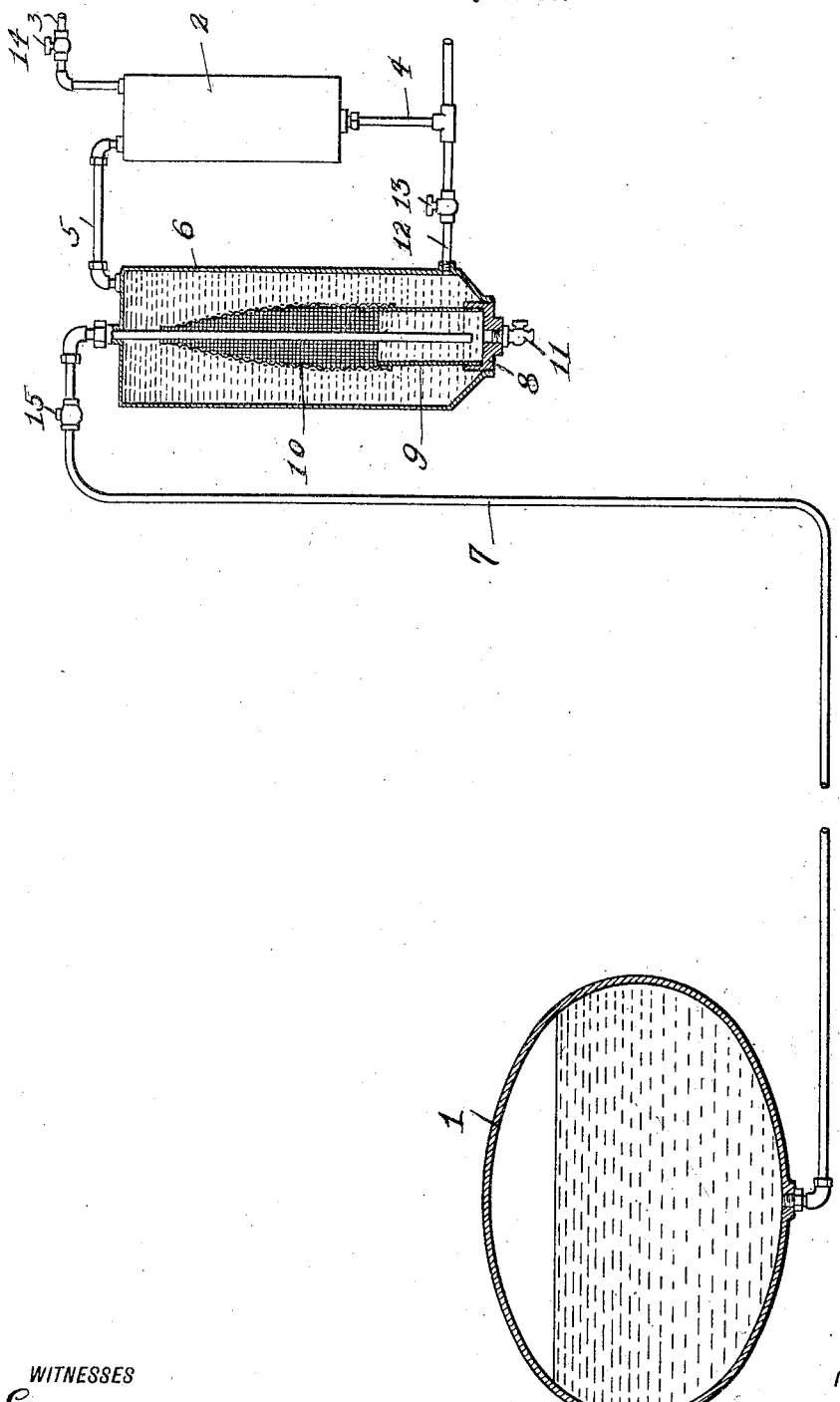
WITNESSES
INVENTOR  
Charles L. Sarnelle  
BY  
ATTORNEYS Patented Nov. 10, 1925.

1,561,358

UNITED STATES PATENT OFFICE.

CHARLES L. SARNELLE, OF BROOKLYN, NEW YORK.

AUXILIARY FUEL TANK FOR AUTOMOBILES.

Application filed April 10, 1923. Serial No. 631,187.

*To all whom it may concern:*

Be it known that I, CHARLES L. SARNELLE, a citizen of the United States, residing at Brooklyn, in the county of Kings and State of New York, have invented new and useful Improvements in Auxiliary Fuel Tanks for Automobiles, of which the following is a specification.

This invention relates to a new and useful idea of an auxiliary fuel tank for automobiles.

An object of the invention is to provide that there will always be a definite amount of fuel on hand when the main tank runs dry and even when the usual vacuum tank supply is exhausted.

A further object is to provide that when the ordinary supply is exhausted the driver must deliberately connect up the auxiliary tank with the engine before he can start on again and therefore must know that he is almost out of fuel.

A further object is to provide such a combination of elements that the driver must take certain steps and perform certain acts before he can make use of the auxiliary tank and after having used it, before he can start up with the regular system again.

The invention is illustrated in the drawing which diagrammatically represents the fuel system of an automobile with the auxiliary tank disposed therein.

In the operation of cars it oftentimes happens that the driver will exhaust his main as well as his vacuum tank before he is aware of the depletion and if he is far from a supply of fuel he will be considerably inconvenienced. By using my auxiliary tank as hereinafter described he can never run short, except deliberately, and then only after he has gotten out and deliberately made extra connections. Under ordinary conditions he will always have a full auxiliary tank even though the main and the vacuum tanks are empty.

The invention is related to an automobile supplied with a main tank 1 and a usual vacuum tank 2. A pipe 3 connects the top of the vacuum tank 2 with a source of suction from the engine. A pipe 4 leads from the bottom of the tank 2 to the carbureter. A pipe 5 leads from the top of the tank 2 to the top of an auxiliary tank 6. A pipe 7 leads from the main tank 1 through the top of the tank 6 within which it depends nearly to the bottom of the tank 6. A threaded plug 8 closes a clean-out opening in the bottom of the tank 6. A cylindrical shell 9 extends vertically from the plug 8 and a tubular screen 10 embraces the upper end of the shell 9 and extends upward to embrace the pipe 7 at a level near the upper end of the tank 6. The bottom of the pipe 7 lies within the shell 9. A cock 11 is disposed in the bottom of the plug 8. A pipe 12 extends from a point near the bottom of the tank 6 to the pipe 4 and a valve 13 is disposed therein. A valve 14 is disposed in the pipe 3. A check valve 15 is disposed in the pipe 7.

In the operation of the device, the suction through the pipe 3 sucks fuel from the tank 1 up the pipe 7 into the tank 6 and thence through the pipe 5 into the vacuum tank 2 until both tanks 2 and 6 are full. At this time the valves 11 and 13 are closed and the valve 14 is open. In leaving the pipe 7 the fuel must pass through the screen 10 and be filtered and dirt therein collecting in the bottom of the shell 9. Any water in the fuel will also settle in the shell and can be drawn off through the cock 11. To clean the tank 6 the plug 8 can be unscrewed and the shell and the screen dropped out of the tank with the plug without deranging any of the other parts of the device. The suction action will continue until the tank 1 and the pipe 7 are empty. Then the suction will draw fuel from the top of tank 6 and just as soon as its level is lowered from the end of the pipe 5 the suction will be broken and further supply of fuel from tank 6 will cease. The driver will then travel on the fuel in the vacuum tank until it is exhausted when the engine will stop. Ordinarily he would be in hard luck unless near a garage but with my auxiliary tank he has a substantially full tank 6 to draw from. However he can not draw from this tank 6 until he opens valve 13 and makes sure to close valve 14 because if he does not close valve 14 the engine suction through the pipe 3 will be balanced by the suction through the pipe 4 and no fuel will flow. He then can run to the nearest garage on the fuel in tank 6. When he fills up his main tank he opens valve 14 and closes valve 13 and starts on again with the system working normally again. It will be observed therefore that the driver cannot possibly accidently run out of gas and when his vacuum tank runs dry he has a full auxiliary tank to fall back on. Certain definite and deliberate actions are required of him before he can make use of this extra tank and other definite actions before he can restore the system to its normal condition. This invention requires no material alteration of the present system and can be installed on any car using a vacuum tank without deranging the ordinary parts thereof. It merely requires the interposition of an extra tank in the proper way between the vacuum tank and the main tank.

What I claim is.

1. A fuel supply system which includes a main tank, a vacuum tank, and an auxiliary tank, a conduit leading from the main tank to the bottom of the auxiliary tank, a conduit leading from the top of the auxiliary tank to the top of the vacuum tank, a conduit leading from the top of the vacuum tank to a source of suction, a conduit leading from the bottom of the vacuum tank to an engine, and a conduit leading from the bottom of the auxiliary tank to the conduit which leads from the bottom of the vacuum tank.

2. In a fuel supply system an auxiliary tank, a pipe leading from a source of fuel supply through the top of the tank nearly to the bottom of said tank, a removable plug closing an opening in the bottom of said auxiliary tank, a shell rising from said plug within the tank, a screen embracing the upper end of the shell and surrounding the pipe within the tank, said plug and shell and screen capable of being removed from the tank through said opening in its bottom without deranging other elements of said system.

3. A fuel supply system including a main tank, an auxiliary tank, a vacuum tank, a pipe between the main tank and the auxiliary tank and extending to the bottom of the auxiliary tank, a check valve in said pipe, a removable plug in the bottom of the auxiliary tank, a shell rising from the plug within the auxiliary tank, a screen surrounding the upper end of the shell and extending to and embracing the pipe within said tank, a cock within said plug, a pipe from the top of the auxiliary tank to the top of the vacuum tank, a pipe from the top of the vacuum tank to a source of suction, a valve in said last mentioned pipe, a pipe leading from near the bottom of the auxiliary tank to the engine, a valve in said last mentioned pipe, and a pipe leading from the bottom of the vacuum tank to the last mentioned pipe.

4. In a fluid fuel supply system for an internal combustion engine, the combination with a main supply tank and a vacuum tank, of an auxiliary fuel supply tank, a conduit leading from the main tank through the top of the auxiliary tank nearly to the bottom of the auxiliary tank, a conduit connecting the upper part of the auxiliary tank with the upper part of the vacuum tank, a valved conduit connecting the upper part of the vacuum tank with a suction producing part of the engine, a conduit connecting the lower part of the vacuum tank with the carburetor of the engine, and a valved conduit connecting the lower part of the auxiliary tank with said last named conduit.

CHAS. L. SARNELLE.